United States Patent Office 3,641,031
Patented Feb. 8, 1972

3,641,031
10-(PIPERAZINYL OR HEXAHYDRODIAZEPINE)-THIENO[3,2-b][1,5]BENZOTHIAZEPINE
Walter Schindler, Riehen, and Armin Zust, Birsfelden, Switzerland, assignors to Geigy Chemical Corporation, Ardsley, N.Y.
No Drawing. Filed Nov. 15, 1968, Ser. No. 776,246
Claims priority, application Switzerland, Nov. 30, 1967, 16,874/67; Dec. 29, 1967, 18,372/67
Int. Cl. C07d 51/70
U.S. Cl. 260—268 TR    7 Claims

ABSTRACT OF THE DISCLOSURE 10-(piperazinyl)-and 10-(hexahydrodiazepinyl)-thieno-[3,2-b][1,5]benzothiazepine derivatives and their pharmaceutically acceptable acid addition salts are prepared; these compounds have a depressant effect on the central nervous system; they are the active ingredients of pharmaceutical compositions; an illustrative embodiment is 10-(4-methyl - 1 - piperazinyl) -thieno[3,2-b][1,5]benzothiazepine.

DETAILED DESCRIPTION

The present invention concerns new thiazepine derivatives, processes for the production thereof, medicaments which contain the new compounds and the use thereof.

More particular, the present invention concerns thiazepine derivatives of the formula

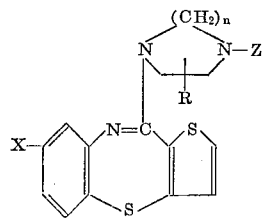

wherein
n is 2 or 3,
R is hydrogen or methyl,
X is hydrogen or chloro, and
Z is hydrogen, lower alkyl, hydroxyloweralkyl, alkanoyloxyalkyl having of from 3 to 9 carbon atoms or cyclopropyl,
and pharmaceutically acceptable acid addition salts thereof.

The compounds of the invention have been found to have valuable pharmacological properties, in particular they have a depressant action on the central nervous system on oral, rectal or parenteral administration.

Especially good activity have compounds of Formula I wherein n is 2, R is hydrogen or methyl, X is hydrogen or chloro and Z is hydrogen, methyl, ethyl or hydroxyethyl. This is a preferred group of compounds.

In the compounds of Formula I, R can take the 2- or 3-position in the piperazine or hexahydro-1H-1,4-diazepine ring. As lower alkyl Z has from 1 to 4 carbon atoms and is, e.g. methyl, ethyl, propyl, isopropyl, butyl, isobutyl or sec. butyl. As hydroxyloweralkyl group, Z has from 1 to 4 carbon atoms and is, e.g. 2-hydroxyethyl, 3-hydroxypropyl or 2-methyl-3-hydroxypropyl. As alkanoyloxyalkyl Z has from 3 to 9 carbon atoms and is, e.g. the 2-acetoxyethyl, 2-propionyloxyethyl, 3-acetoxypropyl, 2-methyl-3-acetoxypropyl, 3-propionyloxypropyl or 2-methyl-3-propionyloxypropyl.

Compounds of Formula I are produced according to the invention by reacting a compound of the formula

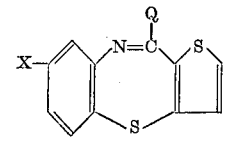

wherein X has the meaning given in Formula I, and Q is halogen or a lower alkoxy group, with a compound of the formula

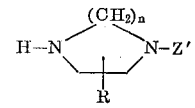

wherein n and R have the meanings given in Formula I and Z' has the meaning of Z or represents a radical which can be replaced by hydrogen by means of hydrolysis, or with an alkali metal derivative of a compound of Formula III, if necessary, hydrolysing a product obtained to convert the radical Z' into hydrogen, optionally converting a product obtained, the radical Z of which is hydrogen, in the known way into a product the radical Z of which is a lower alkyl, lower hydroxyalkyl or an alkanoyloxyalkyl group, or acylating a product obtained, the radical Z of which is a lower hydroxyalkyl group, into one the radical Z of which is an alkanoyloxyalkyl group, or also hydrolysing a product obtained, the radical Z of which is an alkanoyloxyalkyl group into one having a lower hydroxyalkyl group and, if desired, converting a compound obtained of the Formula I into a pharmaceutically acceptable acid addition salt. As lower alkoxy group, Q in Formula II is preferably the methoxy or ethoxy group, and as halogen it is chlorine.

The reaction according to the invention is preferably performed in inert solvents. Suitable inert solvents are, e.g. hydrocarbons such as benzene or toluene, halogenated hydrocarbons such as chloroform, ethers such as diethyl ether and dioxane, as well as lower alkanones such as acetone or methylethyl ketone.

If, in the condensation of one mol of a compound of Formula II with one mol of a compound of Formula III, one mol of acid is split off, an excess of compound of Formula III can be added as acid binding agent, or a tertiary organic base such as triethylamine or pyrimidine is used as such. Sometimes, the bases added can also serve as sole reaction medium. Depending on the meaning of n, R, Q, X and Z, the reaction is more or less exothermic; in order to complete it, the reaction mixture is preferably heated.

If, instead of a compound of Formula III, an alkali metal derivative thereof is used for the reaction according to the invention, e.g. a sodium, potassium or lithium derivative, then it is of advantage to perform the reaction in a hydrocarbon such as benzene or toluene.

Any necessary subsequent conversion of the product from the process into a compound of Formula I, in which product the radical Z' is replaced by hydrogen, can be performed by hydrolysis according to the type of the group Z'.

Radicals which can be converted by hydrolysis into the hydrogen atom are, e.g. lower alkanoyl groups such as the acetyl group, arylcarbonyl groups such as the benzoyl group, radicals of monofunctional derivatives of carbonic or thiocarbonic acid such as the methoxycarbonyl, ethoxycarbonyl, phenoxycarbonyl or the benzyloxycarbonyl group or the corresponding thiocarbonyl groups. The hydrolysis is performed with the aid of an alkali metal hydroxide, e.g. potassium or sodium hydroxide, at a raised temperature, either in a higher boiling organic solvent containing hydroxyl groups such as ethylene glycol or diethylene glycol, or in a lower monoalkyl ether of such a glycol. It can also be performed in a lower alkanol. If a lower alkanol is used then the reaction is preferably performed in a closed vessel. In addition, the hydrolysis can also be performed, e.g. by boiling with alkanolic hydrochloric acid.

The compound which can be used as starting materials of Formula II, the substituent X of which is hydrogen, can be produced, e.g. starting from o-amino-thiophenol. This thiophenol is condensed, in the presence of potassium carbonate and copper-(I) oxide, with 3-bromothiophene to form o-(3-thienylthio)-aniline; that from phosgene is converted into o-(3-thienylthio)-phenyl isocyanate. With the aid of aluminium chloride and with ring closure, the isocyanate obtained yields thieno[3,2-b][1,5]benzothiazepin-10(9H)-one. This lactam is embraced by the Formula IV

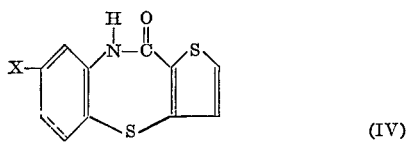

(IV)

wherein X has the meaning given in Formula I. Other compounds of Formula IV, the radical X of which is chlorine, can be produced analogously. Starting materials of the Formula II, the radical Q of which is chlorine, can then be produced from the compounds obtained of the Formula IV, e.g. with the aid of phosphorus pentachloride.

Compounds obtained by the process according to the invention of Formula I, the radical Z of which is hydrogen, can subsequently be alkylated into corresponding compounds the radical Z of which is a lower alkyl group. This is done by reacting these compounds with a reactive ester of a lower alkanol, preferably in a solvent in the presence of an acid binding agent. Halides, e.g. chlorides or bromides, also sulfonic acid esters such as the o- or p-tolyl sulfonic acid methyl or ethyl ester, or sulfuric acid esters such as dimethyl or diethyl sulfate, can be used as reactive esters of lower alkanols. Suitable acid binding agents are alkali metal carbonates such as potassium carbonate, or alkali metal hydroxides such as sodium hydroxide, or tertiary organic bases such as pyridine. Suitable solvents are those which are inert under the reaction conditions, e.g. hydrocarbons such as benzene or toluene, also alkanols such as methanol or ethanol.

The starting materials of Formula I can subsequently be alkylated by a further process by reacting these compounds with a lower aliphatic saturated oxo compound and reducing the reaction product subsequently or in the same step. A compound of Formula I the piperazine or hexahydro-1H-1,4-diazepin ring of which contains a free imino group as ring member can be heated, e.g. with formaldehyde, acetaldehyde, propionaldehyde, butyraldehyde, isobutyraldehyde, acetone or butanone in a solvent, e.g. in a lower alkanol and then the reaction mixture can be reduced with hydrogen in the presence of a sulfidised noble metal catalyst on a suitable carrier. Sulfidised palladium or platinum on charcoal can be used, e.g. as catalyst and, e.g. methanol or ethanol as solvent. However, instead of hydrogen in the presence of a catalyst, also other reducing agents, e.g. formic acid, can be used for the reductive alkylation. For this variation of the process, the compounds mentioned of Formula I are heated with formic acid and a lower aliphatic aldehyde, preferably without solvent.

In addition, compounds of Formula I obtained by the process according to the invention, the radical Z of which is hydrogen, can be converted into compound of Formula I the radical Z of which is a lower hydroxyalkyl group. To introduce the hydroxyalkyl group, the starting materials mentioned are preferably heated in a solvent with an alkyleneoxide such as ethyleneoxide or trimethyleneoxide, or with a reactive monoester of a lower alkane diol. Suitable monoesters of alkane diols are, e.g. halides such as 2-bromoethanol or 3-bromopropanol, or the corresponding chlorides. As solvent, preferably a lower alkanol, e.g. methanol or ethanol, is used. In the condensation of one mol of a reactive monoester of a lower alkane diol with one mol of the piperazine or hexahydro-1H-1,4-diazepine derivative mentioned, one mol of acid is split off. Although this acid is bound to the dibasic reaction product without altering the basic reaction of the mixture, it is of advantage to add an acid binding agent to the mixture, e.g. an alkali metal carbonate such as sodium or potassium carbonate.

Further, according to the process of the invention, a compound of Formula I, the radical Z of which is hydrogen, can be converted into a compound of Formula I the radical Z of which is an alkanoyloxyalkyl group. These end products can be obtained by reacting the compounds of Formula I which contain a free imino group in the piperazine or hexahydro-H-1,4 - diazepine ring, with a reactive ester of the corresponding alkanoyloxy-alkanols, e.g. acetic acid-(2-bromoethyl ester), acetic acid-(3-bromopropylester), as well as the corresponding chloro compounds. It is of advantage to perform this condensation in a solvent. Solvents which are suitable are, e.g. hydrocarbons such as benzene or toluene, also alkanones such as acetone or methylethyl ketone.

The molar amount of acid liberated in the reaction of one mol of starting material with one mol of reaction component is bound, e.g. by an alkali metal carbonate such as sodium or potassium carbonate, or by a tertiary organic base such as pyridine. An excess of tertiary organic base can also be used as solvent.

The same end products are obtained when compounds of the Formula I, the radical Z of which is a lower hydroxyalkyl group, are heated, e.g. with the anhydride of an alkanoic acid such as the anhydride of acetic, propionic, butyric acid, or oenanthic acid or with a corresponding acid halide. For this condensation, in which acid is also split off, the addition of an acid binding agent, e.g. a tertiary organic base such as pyridine, is of advantage. Excess tertiary organic base can also serve as solvent. In addition, a halogenated hydrocarbon, e.g. chloroform, can also be added as solvent.

The hydrolysis of a compound of Formula I, the radical Z of which is an alkanoyloxyalkyl group, into a corresponding compound the radical Z of which is a lower hydrozyalkyl group, can be performed by means of a base, e.g. by means of an alcoholic alkali liquor such as methanolic or ethanolic sodium or potassium hydroxide solution, or by means of a mineral acid, e.g. concentrated hydrochloric acid.

The compounds of Formula I obtained by the processes according to the invention are then converted, if desired, into their addition salts with inorganic and organic acids in the usual way. For example, the acid desired as salt component or a solution thereof is added to a solution of a compound of Formula I in an organic solvent. Preferably organic solvents are chosen for the reaction in which the salt formed does not dissolve easily so that it can be isolated by filtration. Such solvents are, e.g. methanol, acetone, methylethyl ketone, acetone/ethanol, methanol/ether or ethanol/ether.

Instead of free bases, pharmaceutically acceptable acid addition salts can be used as medicaments, i.e. salts with those acids the anions of which are non-toxic in the usual dosages. In addition, it is of advantage if the salts to be used as medicaments can be crystallised well and are not or are only slightly hygroscopic. For example, hydrochloric acid, hydrobromic acid, sulfuric acid, phosphoric acid, methane sulfonic acid, ethane sulfonic acid, 3-hydroxethane sulfonic acid, acetic acid, malic acid, tartaric acid, citric acid, lactic acid, oxalic acid, succinic acid, fumaric acid, maleic acid, benzoic acid, salicyclic acid, phenylacetic acid, mandeclic acid and embonic acid can be used for salt formation with compounds of the Formula I. The salts are prepared via conventional methods.

The compounds of the invention, including the pharmaceutically acceptable acid addition salts thereof, have a depressant action on the central nervous system. This activity is demonstrated in a variety of standard animal tests [cf. Theobald et al., Arch. int. Pharmacodyn. 148, 560 (1964)]. In particular it is demonstrated that the compounds of the invention on oral, rectal or parenteral administration reduce the motility of the test animals, and that they have an anticonvulsive and antiemetic action. Furthermore it is shown that they potentiate the action of anesthetics and antagonise compounds which excite the central nervous system such as amphetamine. They also antagonise the action of adrenaline, acetylcholine, histamine and serotonin.

In these tests the following compounds are particularly active:

(1) 10-(4-methyl-1-piperazinyl)-trieno[3,2-b][1,5] benzothiazepine (as the methanesulfonate);
(2) 4-(thieno[3,2-b][1,5]benzothiazepin-10-yl)-piperazine-1-ethanol (as the dihydrochloride);
(3) 10-(1-piperazinyl)-thieno-[3,2-b][1,5]benzothiazepine (as the dihydrochloride); and
(4) 10-(4-ethyl-1-piperazinyl)-thieno[3,2-b][1,5]benzothiazepine (as the dihydrochloride); and
(5) 10-(2,4-dimethyl-1-piperazinyl)-thieno[3,2-b][1,5] benzothiazepine (as the dihydrochloride).

The toxicity of the compounds of the invention as determined in mice on intravenous administration is of favorable low order.

For their intended use the compounds of the invention are administered in daily dosages of between about 0.5 and about 10 mg./kg. of bodyweight. The exact dosages of course depend on the species, age and weight of the individiuum under treatment as well as on the particular condition to be treated.

Dosage units for oral administration preferably contain between 1–90% of a compound of Formula I or of a pharmaceutically acceptable salt thereof as active substance. They are produced by combining the active substance with, e.g. solid, pulverulent carriers such as lactose, saccarose, sorbitol, mannitol; starches such as potato starch, maize starch or amylopectin, also laminaria powder or citrus pulp powder; cellulose derivatives of gelatine, optionally with the addition of lubricants such as magnesium or calcium stearate or polyethylene glycols, to form tablets or dragee cores. The latter are coated e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between different dosages of active substance.

Other suitable dosage units for oral administration are hard capsules made of gelatine as well as soft, closed capsules made of gelatine and a softener such as glycerine. The hard capsules preferably contain the active substance as a granulate, e.g. in admixture with fillers such as maize starch, and/or lubricants such as talcum or magnesium stearate and, optionally, stabilisers such as sodium metabisulfite ($Na_2S_2O_5$) or ascorbic acid. In soft capsules, the active substance is preferably dissolved or suspended in suitable liquids such as liquid polyethylene glycols, to which stabilisers can also be added.

Examples of dosage units for rectal administration are suppositories which consist of a combination of an active substance or a suitable salt thereof with a fatty foundation, or also gelatine rectal capsules which contain a combination of the active substance or a suitable salt thereof with polyethylene glycols.

Ampoules for parenteral, particularly intramuscular, administration preferably contain a water soluble salt of an active substance in a concentration of, preferably, 0.5–5%, in aqueous solution, optionally together with suitable stabilising agents and buffer substances.

Dry ampoules for parenteral administration preferably contain a water soluble salt of an active substance, optionally together with suitable stabilizers, buffer substances and also fillers, which are soluble in the solvent to be used and which are suitable for the isotonisation of the solution to be produced.

The following examples will serve to further typify the nature of the invention but should not be construed as a limitation thereof.

EXAMPLE 1

(a) A solution of 24 g. of crude 10 - chloro - thieno-[3,2-b][1,5]benzothiazepine in 20 ml. of abs. benzene is added dropwise to a solution of 30.0 g. (0.3 mol) of 1-methyl-piperazine in 40 ml. of abs. benzene. The reaction mixture is refluxed for 16 hours, cooled, poured onto ice water and the reaction is made alkaline with 10 ml. of concentrated ammonia. The organic phase is then removed, washed with water and extracted three times with 100 ml. of 1 N hydrochloric acid each time. The acid, aqueous extract is made alkaline with concentrated ammonia whereupon the free, crude base precipitates. It is taken up in methylene chloride, the methylene chloride solution is dried over magnesium sulphate and concentrated in vacuo. Recrystallisation of the residue from a small quantity of ether/petroleum ether yields pure 10- (4 - methyl - 1 - piperazinyl) - thieno[3,2-b][1,5]benzothiazepine, M.P. 138–140°.

10.0 g. (0.032 mol) of the base obtained are dissolved in 20 ml. of methylethyl ketone and 3.05 g. (0.032 mol) of methane sulphonic acid in 20 ml. of ether are added to this solution. The methane sulphonate precipitates; it is washed with ether and dried in vacuo whereupon it melts at 223–225°.

The starting substance, 10 - chloro - thieno[3,2-b][1,5] benzothiazepine, is prepared as follows:

(b) 166 g. (1.2 mol) of potassium carbonate are suspended in 600 ml. of N,N-dimethyl formamide and 125.2 g. (1 mol) of 2-aminothiophenol are added dropwise at 20–50°. 163 g. (1 mol) of 3-bromothiophene, 15 g. of copper powder and 1.0 g. of copper-(I) oxide are then added to the suspension, the mixture is heated for 20 hours at 140° and poured into 1.5 litres of ice water. 10 ml. of concentrated sodium hydroxide solution, 200 g. of sodium chloride, 400 ml. of ether and 200 ml. of methylene chloride are added to the mixture obtained while stirring and the suspension is filtered over active charcoal and also Celite No. 545, (trademark of Johns-Manville International Corporation, New York). The organic phase of the filtrate is removed, the aqueous phase is extracted three times with ether/methylene chloride 2:1 and the organic extract is washed with saturated, aqueous sodium chloride solution. The combined organic phases are dried over magnesium sulphate, evaporated in vacuo and the residue is distilled under high vacuum. The o-(3 - thienylthio)-aniline obtained boils at 130–140° under 0.01 torr; $n_D^{20°}$: 1.6793.

(c) While stirring at 0–5°, phosgene is introduced into a litre of abs. toluene for 15 minutes. While continuing the introduction of phosgene, 207 g. (1 mol) of o-(3-thienylthio)-aniline are added dropwise within 45 minutes at 0° and then the reaction mixture is brought to room temperature within 30 minutes. It is kept at this temperature for 30 minutes after which the suspension is brought to boiling temperature within 1 hour. As soon as the reaction mixture has become a clear yellow solution the introduction of phosgene is interrupted, the solution is refluxed for another hour and then the excess phosgene is removed by means of a dry stream of nitrogen. The solution is then evaporated in vacuo and the residue is distilled under high vacuum. The o - (3 - thienylthio)-phenyl isocyanate boils at 120–130° under 0.01 torr; $n_D^{20°}=1.6511$.

(d) 23.4 g. (0.175 mol) of finely pulverised aluminium chloride are suspended in 100 ml. of 1,1,2,2-tetrachloroethane. While stirring this solution at −10°, a solution of 37.0 g. (0.159 mol) of o-(3-thienylthio)-phenyl isocyanate in 50 ml. of 1,1,2,2-tetrachloroethane is added dropwise within 15 minutes. The reaction mixture is stirred for 1 hour at −10° and for 16 hours at 0° and then poured into a mixture of 200 ml. of ice water and 5 ml. of 2 N hydrochloric acid. The 1,1,2,2-tetrachloroethane is removed from the reaction mixture by steam distillation. The crude product solidifies in the residue; it is filtered off, washed neutral with water, suspended in 100 ml. of acetone and filtered off under suction. The crude product is recrystallised from N,N-dimethyl formamide whereupon pure thieno[3,2-b][1,5]benzothiazepin-10(9H)-one is obtained, M.P. 255–257°.

(e) 16.3 g. (0.07 mol) of the lactam obtained according to (d) are suspended in 200 ml. of chloroform. 29.1 g. (0.14 mol) of phosphorus pentachloride are added in portions to the suspension at 20–30°, the addition being made while stirring and introducing nitrogen. The reaction mixture is then stirred for 30 minutes at room temperature and concentrated in vacuo. The residue is taken up in chloroform, the chloroform solution is poured onto 200 ml. of ice water and, after shaking well, the organic phase is removed. This is dried over magnesium sulphate and evaporated in vacuo. The residue, 10-chlorothieno[3,2-b][1,5]benzothiazepine, is used in the crude state.

EXAMPLE 2

Analogously to Example 1(a), the following compounds are prepared starting from 10-chloro-thieno[3,2-b][1,5]benzothiazepin:

(a) With piperazine-1-ethanol, 4-(thieno[3,2-b][1,5]benzothiazepin-10-yl) - piperazine-1-ethanol, dihydrochloride, M.P. 243–245° from 80% ethanol/ethyl acetate;

(b) With 1,3-dimethyl-piperazine, 10-(2,4-dimethyl-1-piperazinyl)-thieno[3,2-b][1,5]benzothiazepin, M.P. 168–170°, dihydrochloride, M.P. 234–238°;

(c) With 1-methyl-hexahydro-1H-1,4-diazepin, 10-(4-methyl - hexahydro-1H-1,4 - diazepin-1-yl)-thieno[3,2-b][1,5]benzothiazepine, M.P. 85–87°, dihydrochloride, M.P. 210–212°.

(d) Likewise analogously to Example 1(a), a reaction mixture is obtained from 20 g. (0.05 mol) of 7,10-dichloro-thieno[3,2-b][1,5]benzothiazepin, which is dissolved in 50 ml. of absolute benzene, by reacting with a solution of 20 g. (0.2 mol) of N-methyl-piperazine in 30 ml. of absolute benzene. The reaction mixture is refluxed for 16 hours, poured onto 200 ml. of ice water and mixed with 10 ml. of conc. ammonia and 200 ml. of a mixture of ether/methylene chloride (2:1). The organic phase is removed, made approximately neutral by washing with water and then extracted with 1 N hydrochloric acid.

The acid aqueous solution is rendered alkaline to litmus with conc. sodium hydroxide solution and extracted with methylene-chloride. The methylene chloride extracts are washed with water, dried over magnesium sulphate and concentrated in vacuo. The obtained oily residue is taken up in benzene, applied to a column of 30 g. of silica gel and extracted with a mixture of benzene-acetone (90:10). The extracted product is crystallised from ether/petroleum ether.

The pure 7-chloro-10-(4-methyl-1-piperazinyl)-thieno[3,2-b][1,5]benzothiazepine melts at 140–142°.

The pure base is taken up in acetic ester and converted with ethereal hydrochloric acid into dihydrochloride. M.P. 198–200°.

(e) In an analogous manner to that which has been described under 2(d), are obtained from the crude 7,10-dichlorothieno[3,2-b][1,5]benzothiazepine and piperazine-1-ethanol, the 7 - chloro - 4 - (thieno-[3,2-b][1,5]benzothiazepine-10-yl)piperazine-1-ethanol; M.P. 130–132°; dihydrochloride M.P. 247°.

The 7,10-dichloro - thieno[3,2-b][1,5]benzothiazepine required as starting material was prepared as follows:

(I) 2-(3-thienylthio)-5-chloroaniline 96 g. (0.6 mol) 2-amino-4-chloro-thiophenol are dissolved in 200 ml. of DMF and added dropwise during the course of 15 minutes to a suspension of 110 g. (0.8 mol) of potassium carbonate in 600 ml. of DMF.

The reaction mixture is heated to 120° and 98.7 g. (0.6 mol) of 3-bromothiophen, 9 g. of copper powder and 0.6 g. of copper-I-oxide are added in succession.

After the addition is completed, the content of the flask is adjusted to 140–145° and stirred for 20 hours at this temperature. After cooling, 200 ml. of water and 10 ml. of concentrated sodium hydroxide solution are added, the reaction mixture filtered over active charcoal-Celite and the filter residue washed with alcohol. The combined filtrates are concentrated on the rotary evaporator to ca. 250 ml. and the obtained residue mixed with 500 ml. of ether and 500 ml. of water. The aqueous phase is removed, extracted three times with 100 ml. of ether each time and the ethereal phases are washed with water.

The combined ethereal solutions are dried over magnesium sulphate, the solvent removed in vacuo and the obtained oily residue distilled under high vacuum. The obtained 2-(3-thienylthio)-5-chloro-aniline boils (p.=0.01 mm. Hg) at 156–170°; $n_D^{22}=1.6807$.

(II) 2-(3-thienylthio)-5-chlorophenylisocyanate 800 ml. of abs. toluene are cooled with a mixture of ice and common salt in a stirrer flask down to 0 to −5° and an aqueous stream of phosgene is introduced for 15 minutes.

125 g. (0.514 mol) of 2-(3-thienylthio)-5-chloroaniline, dissolved in 200 ml. of abs. toluene, are then added dropwise in the course of 1 hour with phosgene being continuously introduced.

After the addition is completed, the suspension is slowly heated to room temperature and then to reflux temperature. As soon as a clear yellow solution is obtained, the stream of phosgene is discontinued, the content of the flask refluxed for a further hour and then the excess phosgene is blown out with nitrogen.

The solvent is removed under vacuum and the oily residue distilled under high vacuum. The obtained oily 2-(3-thienylthio)-5-chlorophenylisocyanate has a boiling point of 135–140° (p.=0.01 mm. Hg) $n_D^{22}=1.6584$.

(III) 7-chloro-thieno[3,2-b][1,5]benzothiazepine (9H)-10-on 70.5 g. (0.52 mol) of finely powdered aluminium trichloride are suspended in 500 ml. of 1,1,2,2-tetrachloroethane and cooled to −10° C. A solution of 188 g. (0.48 mol) 2-(3-thienylthio)-5-chlorophenylisocyanate in 200 ml. of 1,1,2,2-tetrachloroethane is then added dropwise in the course of 30 minutes at −10°. The reaction mixture is further stirred for one hour at −10° and for 16 hours at 0° and then poured onto 1 litre of ice water containing 5 ml. of concentrated hydrochloric acid.

The tetrachloroethane is distilled off with steam from the obtained mixture and the solidified product filtered off. The filter residue is washed neutral with water, well filtered off under suction and stirred with 500 ml. of acetone.

The obtained suspension is again filtered off, the filter residue washed with ether and dried in vacuum. The pure 7 - chlorothieno[3,2-b][1,5]benzothiazepine (9H) - 10-on melts at 290–292° and is recrystallised from DMF/ether.

(IV) 7,10-dichloro-thieno[3,2-b][1,5] benzothiazepine 26.7 g. (0.1 mol) of pulverised and sieved 7-chloro-thieno[3,2-b][1,5]benzothiazepine (9H)-10-on are suspended in 300 ml. of chloroform at room temperature under a flow of nitrogen, 41.6 g. (0.2 mol) of phosphorus pentachloride are added in portions.

The reaction mixture is held for 1 hour at 35–40° and the obtained dark reddish-brown solution poured onto ice water. The organic phase is shaken out with ice water and cold sodium bicarbonate solution, dried over magnesium sulphate and concentrated in vacuo. The obtained residue of crude 7,10-dichlorothieno[3,2-b][1,5]benzothiazepine (41 g.) is immediately further processed.

EXAMPLE 3

A mixture of 56.0 g. (0.15 mol) of 4-(thieno[3,2-b] [1,5]benzothiazepin-10-yl)-piperazine - 1 - carboxylic acid ethyl ester, (M.P. 103–105°) and 120 g. (2.1 mol) of pulverized potassium hydroxide in 700 ml. of abs. ethanol is stirred and refluxed for 14 hours. Then 140 ml. of water are added and the reaction mixture is concentrated under vacuum. The oily residue is taken up in ether/methylene chloride (2:1). The ether/methylene chloride solution is washed with water, extracted with 2 N hydrochloric acid, and the aqueous acid solution is rendered alkaline with concentrated sodium hydroxide solution. The crude, free base precipitates. It is filtered, washed well with cold water, dried under vacuum at 50° and recrystallised from benzene/petroleum ether to give the pure 10-(1-piperazinyl) - thieno[3,2-b][1,5]benzothiazepine. M.P. 123–125°, the dihydrochloride of which after recrystallising from ethanol/acetone melts at 234–236°.

The 4-(thieno[3,2-b][1,5]benzothiazepin-10-yl)-piperazine-1-carboxylic acid ethyl ester used as starting material is prepared analogously to Example 1(a) from 10-chloro-thieno[3,2-b][1,5]benzothiazepine and 1-piperazine carboxylic acid ethyl ester.

EXAMPLE 4

A mixture of 6.02 g. (0.020 mol) of 10-(1-piperazinyl) thieno[3,2-b][1,5]benzothiazepine, 4.80 g. (0.024 mol) of p-toluene-sulphonic acid ethyl ester and 3.00 g. (0.022 mol) of potassium carbonate in 100 ml. of acetone is refluxed for 24 hours. The reaction mixture is concentrated under vacuum and the residue is taken up in ice water and chloroform. The organic phase is separated, washed with 2 N sodium hydroxide solution and then water, dried over magnesium sulfate and concentrated under vacuum. The oily residue is treated with ether and the precipitate which separates is filtered over Celite No. 545 (trademark of Johns-Manville International Corporation, New York). The filtrate is concentrated under vacuum, the oily residue is taken up in acetone, and ethereal hydrochloric acid is added to the acetone solution. 10-(4-ethyl-1-piperazinyl)-thieno[3,2-b][1,5]benzothiazepine - dihydrochloride precipitates; recrystallisation from 90% ethanol/ethyl acetate yields the product, M.P. 240–242°.

EXAMPLE 5

A solution of 500 mg. (1.66 mmol) of 10-(1-piperazinyl)-thieno-[3,2-b][1,5]benzothiazepine and 1 ml. (11 mmol) of concentrated aqueous formaldehyde solution in 40 ml. of ethanol is hydrogenated for 5 hours at 20° under normal pressure in the presence of 5% palladium charcoal. The catalyst is then filtered off, rinsed with ethanol and the filtrate is concentrated under vacuum. The oily residue is taken up in benzene, the benzene solution is washed with water, dried over magnesium sulfate and concentrated under vacuum. The residue is recrystallised from benzene/petroleum ether to give pure 10-(4-methyl - 1 - piperazinyl) - thieno[3,2 - b][1,5]benzothiazepine, M.P. 138–140°.

This same end product may further be prepared as follows:

3.0 g. (0.05 mol) of 90% formic acid are mixed in portions while cooling with 3.0 g. (0.01 mol) of 10-(1-piperazinyl)-thieno[3,2-b][1,5]benzothiazepine and 1.2 g. of formaldehyde are added. The reaction mixture is held for 5 hours at 100–110° and then cooled. 10 ml. of concentrated hydrochloric acid are added and the mixture again heated on the water bath.

The reaction mixture is evaporated to dryness in the rotary evaporator, the residue mixed with 50 ml. of water and, after gentle heating, filtered off from the undissolved constituents. The aqueous filtrate is rendered alkaline with 2 N sodium hydroxide solution and extracted with methylene chloride. The methylene chloride solution is dried over magnesium sulphate, concentrated by evaporation in vacuo and the residue crystallised from ether/pentane, M.P. 140–141°. The product is identical to 10-(4-methyl-1-piperazinyl)-thieno[3,2-b][1,5]benzothiazepine.

EXAMPLE 6

To a stirred solution of 30.0 g. (0.1 mol) of 10-(1-piperazinyl)-thieno[3,2-b][1,5]benzothiazepine in 120 ml. of ethanol are introduced 9.0 g. (0.2 mol) of ethylene oxide. Stirring at 20° is continued for 6 hours, whereupon the reaction mixture is heated to the boil within 30 minutes and refluxed for 4 hours. The mixture is then cooled and concentrated under vacuum. The residue is purified by elution chromatography using benzene/acetone/triethylamine (75:25:2) as eluant on a column of silica gel (Merck 0.05–0.2 mm.). The eluant is concentrated by evaporation, the residue is taken up in acetone and converted into the dihydrochloride with ethereal hydrochloric acid. The dihydrochloride is recrystallised from 80% ethanol/ethyl acetate to yield 4-(thieno[3,2-b][1,5]benzothiazepin-10-yl)-piperazine-1-ethanol, M.P. 243–245°.

EXAMPLE 7

A mixture of 15.0 g. (0.05 mol) of 10-(1-piperazinyl)-thieno[3,2-b][1,5]benzothiazepine, 50.0 g. (0.37 mol) of potassium carbonate and 12.5 g. (0.1 mol) of 2-bromoethanol in 120 ml. of abs. toluene is refluxed for 5 hours, then cooled and filtered over Celite No. 545 (trade name of Johns-Manville International Corp., New York). The filtrate is extracted with 2 N hydrochloric acid and the acidic aqueous solution is rendered alkaline with concentrated sodium hydroxide solution. The crude, free base precipitates and is extracted with methylene chloride. The methylene chloride solution is washed with water, dried over magnesium sulfate and concentrated under vacuum. The oily residue is taken up in acetone. The crude dihydrochloride is precipitated from the acetone solution with ethereal hydrochloric acid. The dihydrochloride is recrystallised from 80% ethanol/ethyl acetate to yield pure 4-(thieno[3,2-b][1,5]benzothiazepin - 10 - yl)piperazine-1-ethanol, M.P. 243–245°.

EXAMPLE 8

To a stirred solution of 13.8 g. (0.04 mol) of 4-(thienol [3,2-b][1,5]benzothiazepine)-piperazine-1-ethanol in 50 ml. of abs. pyridine are added dropwise at 0° during 10 hours and then for 3 more hours at 40°. It is then poured The reaction mixture is stirred at room temperature for 15 minutes 7.1 g. (0.048 mol) of oenanthic acid chloride. onto 500 ml. of ice water and extracted three times with benzene. The combined benzene solutions are washed six times with water, dried over magnesium sulfate and concentrated under vacuum. The oily residue is dried under high vacuum at 40° to constant weight and taken up in benzene. The benzene suspension is brought to the boil and filtered over Celite No. 545 (trademark of Johns-Manville International Corp., New York) to remove small amounts of any undissolved particles. The filtrate is concentrated to dryness under vacuumm, the residue is taken up in acetone and the hydrochloride is precipitated with ethereal hydrochloric acid. The resulting 10-[4-(2-heptanoyloxyethlyl)-1-piperazinyl]thieno[3,2 - b][1,5]benzothiazepine-hydrochloride is recrystallised from water/ethanol; M.P. 200–204°.

(8a) 8.7 g. (0.025 mol) of 4-(thieno[3,2-b][1,5]benzothiazepine)-piperazine-1-ethanol are dissolved in 50 ml. of abs. pyridine. 2.9 g. (0.028 mol) of acetic anhydride are added to this soltuion dropwise in the course of 10 minutes at 0 to +5°. The reaction mixture is then stirred for 16 hours at room temperature, then poured onto 200 ml. of ice water and shaken out with ether-methylene chloride (2:1). The organic phases are washed six times with water, dried over magnesium sulphate and concentrated in vacuo. The residue is dried for 12 hours at 20° under high vacuum. The product is taken up in benzene and purified on 200 g. of silica gel. The column is eluted with benzeneacetone (75:25), whereupon the obtained extracts are concentrated in vacuo. The oily residue is crystallised from ether-pentane, 8.2 g. of 10-(4-acetoxyethyl-1-piperazinyl) - thieno[3,2-b][1,5]benzothiazepine, M.P. 112–113°, are obtained.

(8b) This same end product can also be obtained by dissolving 15.0 g. (0.05 mol) of 10-(1-piperazinyl)-thieno[3,2-b][1,5]benzothiazepine with 10.0 g. (0.06 mol) of acetic acid-2-bromoethyl ester in 100 ml. of benzene and adding 8.3 g. (0.06 mol) of potassium carbonate. The reaction mixture is refluxed for 16 hours, cooled somewhat and poured onto 300 ml. of ice water. The benzene layer is separated off, washed with water and dried over magnesium sulphate. The crude base obtained after evaporation of the benzene is subjected to chromatographic adsorption on a column with 200 g. of silica gel and benzene-acetone-triethylamine (75:25:0.5). The extracted base is crystallised from ether-pentane, M.P. 112–113°.

(8c) The 10-(4-acetoxyethyl-1-piperazinyl)-thieno[3,2-b][1,5]benbothiazepine obtained according to Example 8a or 8b can be hydrolysed as follows to obtain the corresponding 4-hydroxyethyl compound:

5.0 g. (0.013 mol) of 10-(4-acetoxyethyl-1-piperazinyl)-thieno[3,2-b][1,5]benzothiazepine are dissolved in 100 ml. of alcohol, 3 ml. of concentrated sodium hydroxide solution and 3 ml. of water then being added. The reaction mixture is refluxed for 5 hours and then diluted with 100 ml. of water. The alcohol is to a great extent removed in vacuo and the remaining mixture is extracted with methylene chloride. The organic extracts are washed with water, dried over magnesium sulphate and the solvent is removed under vacuum. The obtained residue is crystallised from a little benzene and petroleum ether, whereupon the pure 10-(4-hydroxyethyl-1-piperazinyl)-thieno[3,2-b][1,5]benzothiazepine, M.P. 104–106°, is obtained. The dihydrochloride, M.P. 243–245°, precipitates out after addition of ethereal hydrochloric acid.

EXAMPLE 9

15 g. (0.057 mol) of 10-ethoxy-thieno[3,2-b][1,5]benzothiazepine are dissolved in 20 ml. of toluene and to this solution are added 22.8 g. (0.228 mol) of N-methyl piperazine. The reaction mixture is refluxed for 20 hours, cooled somewhat and poured onto 200 ml. of ice water. The mixture is extracted with benzene and washed five times with water. The organic phases are extracted with 100 ml. of 2 hydrochloric acid, the acid aqueous extracts made alkaline with concentrated sodium hydroxide solution and then shaken out with ether/methylene chloride (2:1). The organic layer is separated off, washed with water and dried over magnesium sulphate. After removal of the solvent in vacuo, the obtained solid residue is recrystallised from ether/petroleum ether and yields 13.5 g. of pure 10-(4-methyl-piperazinyl)-thieno[3,2-b][1,5]benzothiazepine, M.P. 138–140°.

The 10 - ethoxy-thieno[3,2-b][1,5]benzothiazepine required as starting material can be produced as follows:

23.0 g. (0.086 mol) of crude 10-chloro-thieno[3,2-b][1,5]benzothiazepine are dissolved in portions in 100 ml. of absolute ethanol and refluxed for 30 minutes. The reaction mixture is then concentrated in vacuo and the obtained residue dissolved in ether. The ethereal solution is filtered off over Celite, then washed with ether, whereupon the combined filtrates are concentrated. The obtained residue is crystallised from a little ether and pentane. The pure 10-ethoxy-thieno[3,2-b][1,5]benzothiazepine melts at 86–88°.

The following prescriptions further illustrate the production of tablets, dragées, suppositories and dry ampoules:

EXAMPLE 10

250 g. of 10-(4-methyl-1-piperazinyl)-thieno[3.2 - b][1,5]benzothiazepine dihydrochloride are mixed with 175.80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicum dioxide are mixed in and the mixture is pressed into 10,000 tablets, each weighing 100 mg. and containing 25 mg. of active substance. If desired, the tablets can be grooved for better adaptation of the dosage.

EXAMPLE 11

A granulate is prepared from 250 g. of 4-(thieno[3,2-b][1,5]benzothiazepin-10-yl)piperazine-1-ethanol dihydrochloride, 175.90 g. of lactose and the alcoholic solution of 10 g. of stearic acid. After drying, the granulate is mixed with 56.60 g. of colloidal silicum dioxide, 165 g. of talcum, 20 g. of potato starch and 2.50 g. of magnesium stearate and the mixture is pressed into 10,000 dragée cores. These are then coated with a concentrated syrup made from 502.28 g. of crystallised saccharose, 6 g. of shellac, 10 g. of gum arabic, 0.22 g. of dyestuff and 1.5 g. of titanium dioxide and dried. The dragées obtained each weigh 120 mg. and contain 25 mg. of active substance.

EXAMPLE 12

To produce suppositories, a suppository mixture is prepared from 10.0 g. of 10-(1-piperazinyl)thieno[3,2-b][1,5]benzothiazepine and 163.5 g. of Adeps solidus. This mixture is used to pour out 100 suppositories, each containing 100 mg. of active substance.

EXAMPLE 13

Dry ampoules can be produced as follows:
25 g. of sterilized and fibre-free 10-(4-methyl-1-piperazinyl)thieno[3,2-b][1,5]benzothiazepine dihydrochloride are mixed with 12 g. of sterilized and fibre-free sodium chloride under aseptic conditions. Avoiding microbic contamination, 37 mg. of the mixture are placed each time into 1000 sterilized injection-flasks, which are closed with sterilized stoppers and caps. To produce an injectable solution, 2 ml. of sterile distilled water with 25 mg. of active substance are injected into an injection flask and shaken until the substance has dissolved.

What we claim is:
1. A compound of the formula

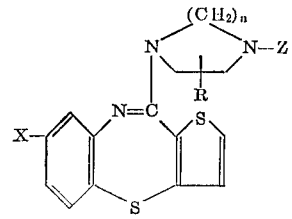

(I)

wherein $n$ is 2 or 3;

R is hydrogen or methyl;

X is hydrogen or chloro; and

Z is hydrogen, lower alkyl, hydroxyloweralkyl, alkanoyloxyalkyl having from 3 to 8 carbon atoms, or cyclopropyl;

or a pharmaceutically acceptable acid addition salt thereof.

2. A compound according to claim 1, wherein $n$ is 2; R is hydrogen or methyl; X is hydrogen or chloro; and Z is hydrogen, methyl, ethyl or hydroxyethyl.

3. The compound according to claim 1, wherein $n$ is 2; R is hydrogen; X is hydrogen and Z is methyl.

4. The compound according to claim 1, wherein $n$ is 2; R is hydrogen; and Z is hydroxethyl.

5. The compound according to claim 1, wherein $n$ is 2; R is hydrogen; and Z is hydrogen.

6. The compound according to claim 1 wherein $n$ is 2; R is methyl in 2-position; X is hydrogen; and Z is methyl.

7. The compound according to claim 1 wherein $n$ is 2; R is hydrogen; X is hydrogen and Z is ethyl.

References Cited

UNITED STATES PATENTS

| 3,349,087 | 10/1967 | Renz et al. | 260—332.5 X |
| 3,474,099 | 10/1969 | Renz et al. | 260—268 X |

DONALD G. DAUS, Primary Examiner

U.S. Cl. X.R.

260—239 B, 268 R, 332.5; 424—250, 275